(12) United States Patent
Ha et al.

(10) Patent No.: US 11,462,210 B2
(45) Date of Patent: Oct. 4, 2022

(54) DATA COLLECTING METHOD AND SYSTEM (71) Applicants: NAVER CORPORATION, Seongnam-si (KR); LINE CORPORATION, Tokyo (JP)

(72) Inventors: Jung Woo Ha, Seongnam-si (KR); Jung Myung Kim, Seongnam-si (KR); Jang Yeon Park, Seongnam-si (KR); Chanju Kim, Seongnam-si (KR); Dong Won Kim, Seongnam-si (KR)

(73) Assignees: NAVER CORPORATION, Seongnam-si (KR); LINE CORPORATION, Tokyo (JP)

( * ) Notice: Subject to any disclaimer, the term of this patent is extended or adjusted under 35 U.S.C. 154(b) by 312 days.

(21) Appl. No.: 16/593,488

(22) Filed: Oct. 4, 2019

(65) Prior Publication Data
US 2020/0035225 A1 Jan. 30, 2020

Related U.S. Application Data (63) Continuation of application No. PCT/KR2018/004061, filed on Apr. 6, 2018.

(30) Foreign Application Priority Data

Apr. 7, 2017 (KR) .......................... 10-2017-0045391

(51) Int. Cl.
*G10L 15/16* (2006.01)
*G06N 20/00* (2019.01)
(Continued)

(52) U.S. Cl.
CPC ................ *G10L 15/16* (2013.01); *G06N 3/08* (2013.01); *G06N 20/00* (2019.01); *G10L 25/51* (2013.01)

(58) Field of Classification Search
None
See application file for complete search history.

(56) References Cited

U.S. PATENT DOCUMENTS 5,909,663 A * 6/1999 Iijima ................... G10L 19/005
704/226
9,262,521 B2 2/2016 Kim et al.
(Continued)

FOREIGN PATENT DOCUMENTS

JP 2017027044 A 2/2017
KR 1020130058939 * 11/2008
(Continued)

OTHER PUBLICATIONS

Office Action dated Jan. 19, 2018 in corresponding Korean Patent Application No. 10-2017-0045391.
(Continued)

*Primary Examiner* — Quynh H Nguyen
(74) *Attorney, Agent, or Firm* — Greer, Burns & Crain, Ltd.

(57) ABSTRACT

A method of determining a highlight section of a sound source includes obtaining a sound source and classification information of the sound source, and learning a neural network by using the sound source and the classification information. The neural network includes an input layer including a node corresponding to a feature value of each of a plurality of sections obtained by splitting the sound source according to a time axis, an output layer including a node corresponding to the classification information, a hidden layer defined between the input layer and the output layer, a first function between the input layer and the hidden layer, and a second function between the hidden layer and the output layer, wherein the first function includes an attention model for calculating a weighted sum of the feature value of each section. The highlight section of the sound source is (Continued)

determined based on weight information of a feature value node of each section included in the first function.

11 Claims, 6 Drawing Sheets

(51) Int. Cl.
  *G06N 3/08* (2006.01)
  *G10L 25/51* (2013.01)

(56) References Cited

U.S. PATENT DOCUMENTS

| | | | | |
|---|---|---|---|---|
| 2002/0191799 A1* | 12/2002 | Nordqvist | ............ | H04R 25/505 |
| | | | | 381/60 |
| 2016/0026913 A1 | 1/2016 | Moon et al. | | |
| 2016/0247064 A1 | 8/2016 | Yoo et al. | | |
| 2017/0025119 A1 | 1/2017 | Song et al. | | |

FOREIGN PATENT DOCUMENTS

| | | | |
|---|---|---|---|
| KR | 1020130058939 A | | 6/2013 |
| KR | 1020140112313 A | | 9/2014 |
| KR | 1020160102690 | * | 2/2015 |
| KR | 1020160012537 A | | 2/2016 |
| KR | 1020160102690 A | | 8/2016 |

OTHER PUBLICATIONS

Notice of Allowance dated Jul. 19, 2018 in corresponding Korean Patent Application No. 10-2017-0045391.
ISR issued in Int'l. App. No. PCT/KR2018/004061.

* cited by examiner

DATA COLLECTING METHOD AND SYSTEM

CROSS-REFERENCE TO RELATED APPLICATIONS

This is a continuation application of International Application No. PCT/KR2018/004061, filed Apr. 6, 2018, which claims benefit of Korean Patent Application No. 10-2017-0045391, filed Apr. 7, 2017.

BACKGROUND OF THE INVENTION

Field of Invention

Embodiments of the present disclosure relate to a method, apparatus, and computer program for determining a highlight section of a sound source.

Description of Related Art

With the increase in demand for sound source files, users are able to store various sound source files in electronic devices and reproduce the sound source files anytime and anywhere, and thus user convenience has increased. However, there is a demand for providing some highlight sections instead of the entire sound source, according to the circumstances in which the sound source is provided.

BRIEF SUMMARY OF THE INVENTION

Embodiments of the present disclosure provide a method, apparatus, and computer program for determining a highlight section of a sound source by using a neural network learning a relationship between the sound source and classification information.

According to an aspect of the present disclosure, a method of determining a highlight section of a sound source by using a processor includes: obtaining a sound source and classification information of the sound source; learning a neural network by using the sound source and the classification information, the neural network including an input layer including a node corresponding to a feature value of each of a plurality of sections obtained by splitting the sound source according to a time axis, an output layer including a node corresponding to the classification information, a hidden layer defined between the input layer and the output layer, a first function between the input layer and the hidden layer, and a second function between the hidden layer and the output layer, wherein the first function includes an attention model for calculating a weighted sum of the feature value of each section; and determining a highlight section of the sound source, based on weight information of a feature value node of each section included in the first function.

In one embodiment, the hidden layer may include a node corresponding to an integrated feature value of the sound source obtained from the feature value of each section, according to the first function.

In one embodiment, the first function may further include a 1-1st function calculating a similarity of an output value of the attention model and an output value of a recurrent neural network (RRN) model, wherein the hidden layer may include a node of the similarity.

In one embodiment, after the obtaining of the sound source and the classification information of the sound source, the determining of the highlight section of the sound source may further include converting the sound source including sound data regarding the time axis to include energy data regarding the time axis, wherein the plurality of sections are obtained by splitting the converted sound source according to the time axis.

In one embodiment, the determining may include determining the highlight section based on the weight information of the feature value node of each section and the energy data of each section.

In one embodiment, the determining of the highlight section of the sound source may include determining an important section based on the weight information of the feature value node of each section and determining the highlight section among the sections of the sound source by referring to energy data within a section of a pre-set range before and after the important section.

In one embodiment, the determining may include determining the highlight section in response to a point of time when momentum of the energy data is greatest within the section of the pre-set range.

According to another aspect of the present disclosure, provided is a computer program stored in a medium to execute one of the methods described above by using a computer.

According to another aspect of the present disclosure, an apparatus for determining a highlight section of a sound source includes: a sound source obtainer configured to obtain a sound source and classification information of the sound source; a neural network processor configured to learn a neural network by using the sound source and the classification information, the neural network including an input layer including a node corresponding to a feature value of each of a plurality of sections obtained by splitting the sound source according to a time axis, an output layer including a node corresponding to the classification information, a hidden layer defined between the input layer and the output layer, a first function between the input layer and the hidden layer, and a second function between the hidden layer and the output layer, wherein the first function includes an attention model for calculating a weighted sum of the feature value of each section; and a highlight determiner configured to determine a highlight section of the sound source, based on weight information of a feature value node of each section included in the first function.

Other aspects, features, and advantages other than those described above will become apparent from the following drawings, claims, and detailed description of the disclosure.

These general and specific aspects may be practiced using systems, methods, computer programs, or any combination of systems, methods, computer programs.

According to a method, apparatus, and computer program of the present disclosure, a highlight section of a sound source is determined by using a neural network learning a relationship between the sound source and classification information, and thus the highlight section where the classification information of the sound source is considered can be determined, and accordingly, a highlight section determining performance is enhanced.

According to a method, apparatus, and computer program for determining a highlight section of the present disclosure, a highlight section determining performance is enhanced by determining a highlight section of a sound source, based on a section playing the most important role among a plurality of sections of the sound source, by using a neural network including an attention model assigning a weight to each section of the sound source.

DETAILED DESCRIPTION OF THE INVENTION

As the present disclosure allows for various changes and numerous embodiments, particular embodiments will be illustrated in the drawings and described in detail in the written description. Effects and features of the present disclosure, and methods of achieving them will be apparent with reference to the embodiments described below in detail together with the drawings. However, the present disclosure is not limited to the embodiments disclosed below but may be implemented in various forms.

Hereinafter, embodiments of the present disclosure will be described in detail with reference to the accompanying drawings, and the same or corresponding components will be denoted by the same reference numerals, and redundant description thereof will be omitted.

In the following embodiments, the terms such as 'first', 'second', etc. are used for the purpose of distinguishing one component from other components rather than a restrictive meaning. In the following examples, the singular forms include plural forms unless the context clearly indicates otherwise. In the following embodiments, the terms such as 'including' or 'comprising' may indicate that there is a feature or component described in the specification and does not preclude the possibility of one or more other features or components. In the drawings, components may be exaggerated or reduced in size for convenience of description. For example, the size and thickness of each component shown in the drawings are arbitrarily shown for convenience of description, and thus the present disclosure is not necessarily limited to the illustrated.

Figure 1:
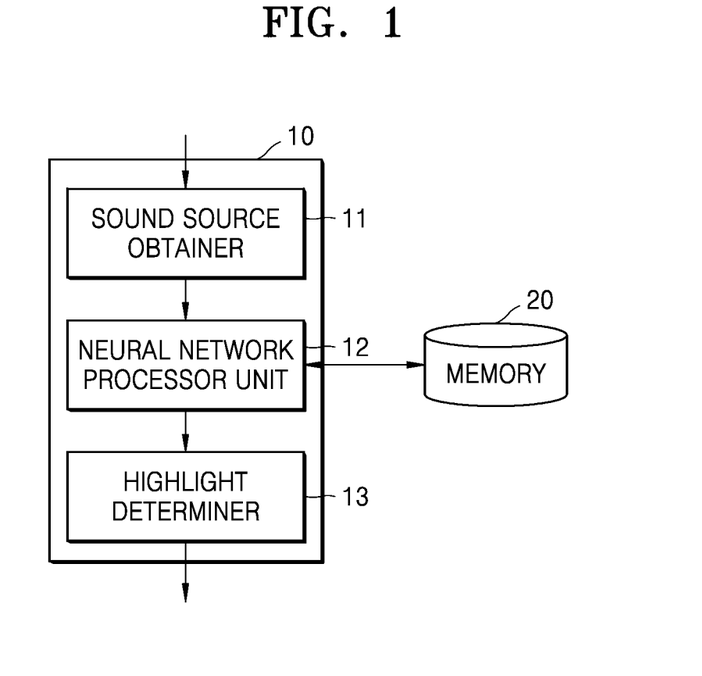
FIG. 1 is a block diagram showing a configuration of a sound source analyzing system according to an embodiment of the present disclosure.

FIG. 1 is a diagram showing a configuration of a sound source analyzing system according to an embodiment of the present disclosure.

Referring to FIG. 1, the sound source analyzing system according to an embodiment of the present disclosure includes a processor 10 and a memory 20. The sound source analyzing system provided according to an embodiment of the present disclosure may determine a highlight section of a sound source input to the processor 10 by using a neural network stored in the memory 20. The highlight section may refer to characteristic signature section that allows the user to think of the classification information of the sound source. The neural network may be constructed to define a relationship between a sound source and classification information by learning a plurality of sound sources and classification information of each sound source. The classification information may be a type of tag information labeled with respect to the sound source. For example, the classification information may include one or more of a genre, a mood, a preferred age group, a theme, and an atmosphere of the sound source. When the classification information is a genre, the classification information may include one or more genre values from among a plurality of music genres such as hip hop, rock, ballad, and R&B. The classification information may be expressed in a form of a vector indicating a probability of corresponding to each classification.

For example, the classification information indicating a genre may be expressed in a vector including probabilities of four genres [hip hop, rock, ballad, and R&B]. The classification information labeled as "hip hop" may be expressed in a vector [1, 0, 0, 0]. The classification information labeled as "hip hop" and "rock" may be expressed in a vector [0.5, 0.5, 0, 0].

One or more machine learning algorithms may be used for neural network learning. For example, a convolution neural network algorithm may be used to extract a feature value of the sound source in a form of a vector.

The processor 10 of FIG. 1 may correspond to any type of apparatus capable of processing data. For example, the processor 10 may refer to a data processing apparatus embedded in hardware having a circuit that is physically structured to perform a function represented in a code or command included in a program. The processor 10 may correspond to one or more processing apparatuses or may include one or more processing apparatuses. As such, examples of the data processing apparatus embedded in hardware include a microprocessor, a central processing unit (CPU), a processor core, a multiprocessor, an application-specific integrated circuit (ASIC), a field programmable gate array (FPGA), and the like, but are not limited thereto. Accordingly, the processor 10 may be driven by being included in another hardware apparatus such as a microprocessor or a general purpose computer system.

The memory 20 is a storage apparatus capable of communicating with the processor 10, and performs a function of temporarily or permanently storing data processed by the processor 10. The memory 20 and the processor 10 may be directly connected to each other by being provided in one apparatus or may be connected via wires or wirelessly by being provided in separate apparatuses. The memory 20 may include a magnetic storage medium or a flash storage medium, but is not limited thereto.

The sound source analyzing system of FIG. 1 illustrates only the components related to the current embodiment so as to prevent features of the current embodiment from being blurred. Accordingly, it would be obvious to one of ordinary skill in the art that the sound source analyzing system may include general purpose components other than those shown in FIG. 1.

The processor 10 according to an embodiment of the present disclosure includes a sound source obtainer 11, a neural network processor unit 12, and a highlight determiner 13.

The sound source obtainer 11 according to an embodiment of the present disclosure obtains the sound source and the classification information of the sound source. The sound source and the classification information of the sound source may be input by a user, input by a server, input by another apparatus, read from the memory 20, or input by a unit included in the processor 10 but not shown in FIG. 1, and an input subject is not limited.

The neural network processor unit 12 according to an embodiment of the present disclosure learns the neural network stored in the memory 20 by using the sound source and the classification information obtained by the sound source obtainer 11. The neural network may denote an artificial neural network learned via machine learning. The artificial neural network denotes a model in which artificial neurons (nodes) forming a network via connecting of synapses learn problem solving capability by changing connection strength of the synapses through learning. The neural network according to an embodiment of the present disclosure is a neural network that learns a relationship between the sound source and the classification information by using training data including the sound source to which the classification information is labeled. The neural network may include attributes of an input object and output object in forms of vectors.

The neural network according to an embodiment of the present disclosure may include an input layer, a hidden layer, and an output layer, and may include a relationship function between such layers. For example, the neural network includes a first function between the input layer and the hidden layer, and a second function between the hidden layer and the output layer. The input layer may include a node corresponding to a feature value of each of a plurality of sections obtained by splitting the sound source according to a time axis. The hidden layer is defined between the input layer and the output layer, and may include one or more layers. The output layer may include a node corresponding to the classification information of the sound source.

The hidden layer may include a node of an integrated feature value obtained according to the first function from the node of the feature value of each section included in the input layer. The integrated feature value may be a feature value regarding the entire sound source.

The first function is a function connecting the node of the feature value for each section of the sound source included in the input layer to the hidden layer, and includes an attention model calculating a weighted sum of the feature value for each section. The neural network processor unit 12 may obtain weight information indicating a degree of contribution of each section to estimation of the classification information of the sound source, by using the attention model.

The first function may include a recurrent neural network (RNN) model outputting a result from a sequence of the feature value of each section. The first function may further include a 1-1st function calculating a similarity between the weighted sum obtained by the attention model and an output value of the RRN model, wherein an output value of the 1-1st function may be a node of the hidden layer. In other words, the hidden layer may include a node of the similarity output by the 1-1st function, and accordingly, the neural network may consider the similarity output by the 1-1st function as a variable for estimating the classification information.

The neural network processor unit 12 according to an embodiment of the present disclosure may obtain the feature value of each section by applying a convolution neural network (CNN) with respect to the plurality of sections obtained by splitting the sound source obtained by the sound source obtainer 11, according to the time axis. The feature value of each section may be expressed in an N-dimensional vector determined according to a parameter of the CNN, and the feature value for each section may be used as a node value of the input layer of the neural network according to an embodiment of the present disclosure. In other words, the neural network according to an embodiment of the present disclosure may calculate the input layer from sound source data, and apply the CNN during such a process. The process may be a process of encoding the sound source data into a form of a vector used in the neural network.

The highlight determiner 13 according to an embodiment of the present disclosure determines the highlight section of the sound source, based on the weight information regarding the feature value node of each section included in the first function learned by the neural network processor unit 12. Because the highlight determiner 13 according to an embodiment of the present disclosure determines the highlight section according to the weight information for each section indicating the degree of contribution to determination of the classification information of the sound source, a highlight section determining mechanism which considers the classification information of the sound source may be provided. For example, the highlight determiner 13 may learn a section playing the most important role in determining the classification information among the sections of the sound source and extract the highlight section based on the learned section, and as a result, the highlight determiner 13 may determine, as the highlight section, a characteristic signature section that allows the user to think of the classification information of the sound source.

The highlight determiner 13 may determine an important section according to the weight information for each section of the sound source learned by the neural network processor unit 12, and determine the highlight section based on the determined important section. For example, the highlight determiner 13 may determine a section identical to the important section as the highlight section or newly define the highlight section including at least a part of the important section. The important section may be a section of which a weight for estimating the classification information of the sound source is the highest.

The highlight determiner 13 may determine the important section considering the sound source data of each section and the weight of each section together. For example, a section having the highest score calculated via a pre-set method using the sound source data of each section and the weight of each section may be determined as the important section, and the highlight section may be determined based on the determined important section. For example, the highlight determiner 13 may calculate a score simultaneously considering the weight of each section and energy or pitch information for each frequency extracted from the sound source data of each section, and the section having the highest score is determined as the important section. The highlight determiner 13 may calculate a high score when a weight is high and calculate a high score when a value of extraction information of the sound source data is high.

According to an embodiment of the present disclosure, the processor 10 may determine the highlight section of the sound source by using energy data for each section and the weight of each section. In the current embodiment, the sound source obtainer 11 may obtain the sound source including sound data regarding a time axis, and the classification information of the sound source. According to the current embodiment, the neural network processor unit 12 may convert and use the sound source including the sound data regarding the time axis to include the energy data regarding the time axis. The energy data may include a value regarding one or more frequency channels. The neural network processor unit 12 may calculate the feature value for the plurality of sections obtained by splitting the energy data of the sound source according to the time axis, and use the feature value as the node of the input layer.

In the current embodiment, the neural network processor unit 12 may convert the sound source data by using a fast Fourier transform (FFT) algorithm. The converted sound source data may include an energy value regarding each of the plurality of frequency channels regarding the time axis. In the current embodiment, the neural network processor unit 12 may convert the sound source data into sound source data expressed in energy regarding time and frequency by converting the sound source data into a Mel-spectrogram. A sound source converting algorithm is not limited thereto.

In the current embodiment, the highlight determiner 13 may determine the important section based on the weight information regarding the feature value node of each section and sound source factor data in another form, such as energy or pitch of each section. For example, the highlight determiner 13 may determine a section having the highest score calculated via a pre-set method using the weight of each section and an energy sum of each section and, as the important section, and determine the highlight section based on the determined important section. For example, the highlight determiner 13 may calculate the score considering the weight of each section and the energy sum of each section at the same time, and determine the section having the highest score as the important section. The highlight determiner 13 may calculate a high score when the weight is high and calculate a high score when the energy sum is high.

Accordingly, a section may not be determined as the important section when the section has a low energy sum compared to other sections even when the section has a high weight, and the important section may be determined in consideration of both the energy of an actual section and the weight information indicating a degree of contribution to determination of the classification information.

According to an embodiment, the highlight determiner 13 may determine the highlight section by referring to energy data of the important section. For example, the highlight determiner 13 may determine the highlight section that is a partial section of the entire sound source, by referring to energy data of a section within a pre-set range before and after a certain point of time of the important section.

For example, the highlight determiner 13 may determine the highlight section in response to a point of time when momentum or a value of the energy data of the section within the pre-set range before and after the certain point of time of the important section is the highest. For example, the highlight determiner 13 may determine the highlight section in response to a point of time where a first derivative or a second derivative with respect to time of the energy data is the highest. The highlight determiner 13 may determine a point of time where the value or momentum of the energy data is the highest as a start point and determine the highlight determiner 13 having a pre-set length.

Although not shown in FIG. 1, the processor 10 according to an embodiment of the present disclosure may further include a unit for providing a service by using the highlight section determined by the highlight determiner 13. For example, the processor 10 may include a service provider (not shown) providing a sound source pre-listening service by using the highlight section of 1 minute length. Also, the service may be a service for quickly checking a composition of recommended music or quickly checking a user's music taste.

Figure 2A:
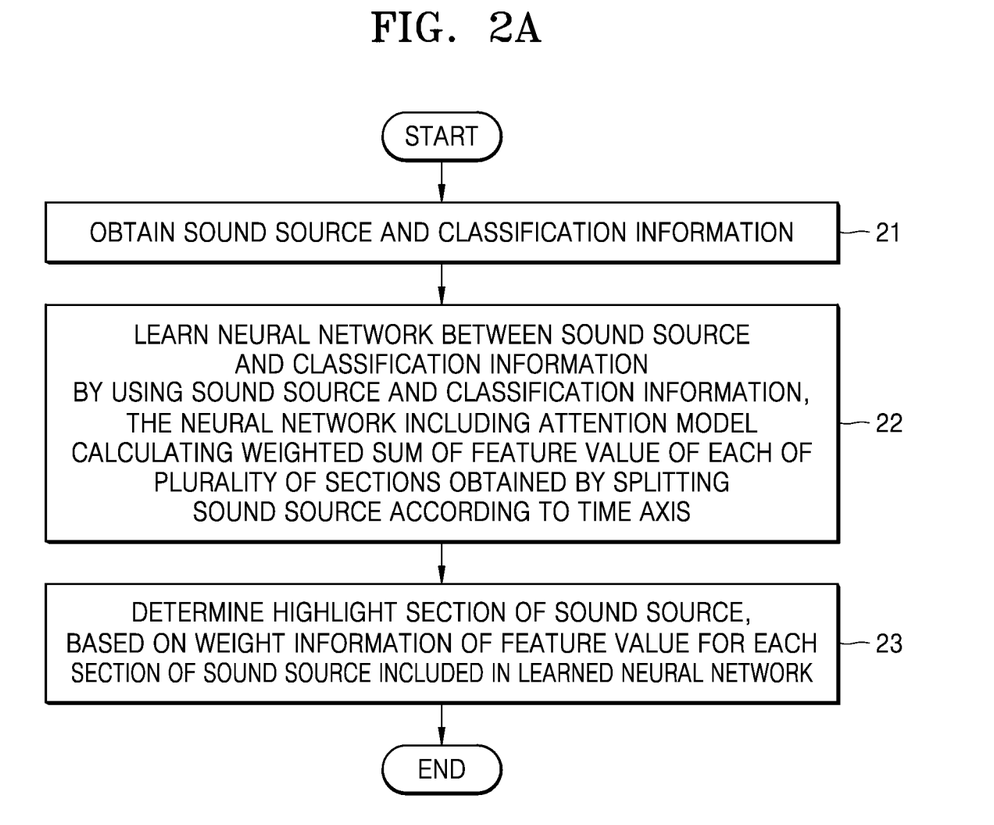
FIGS. 2A and 2B are flowcharts of methods of determining a highlight section of a sound source, according to embodiments of the present disclosure.
Figure 2B:
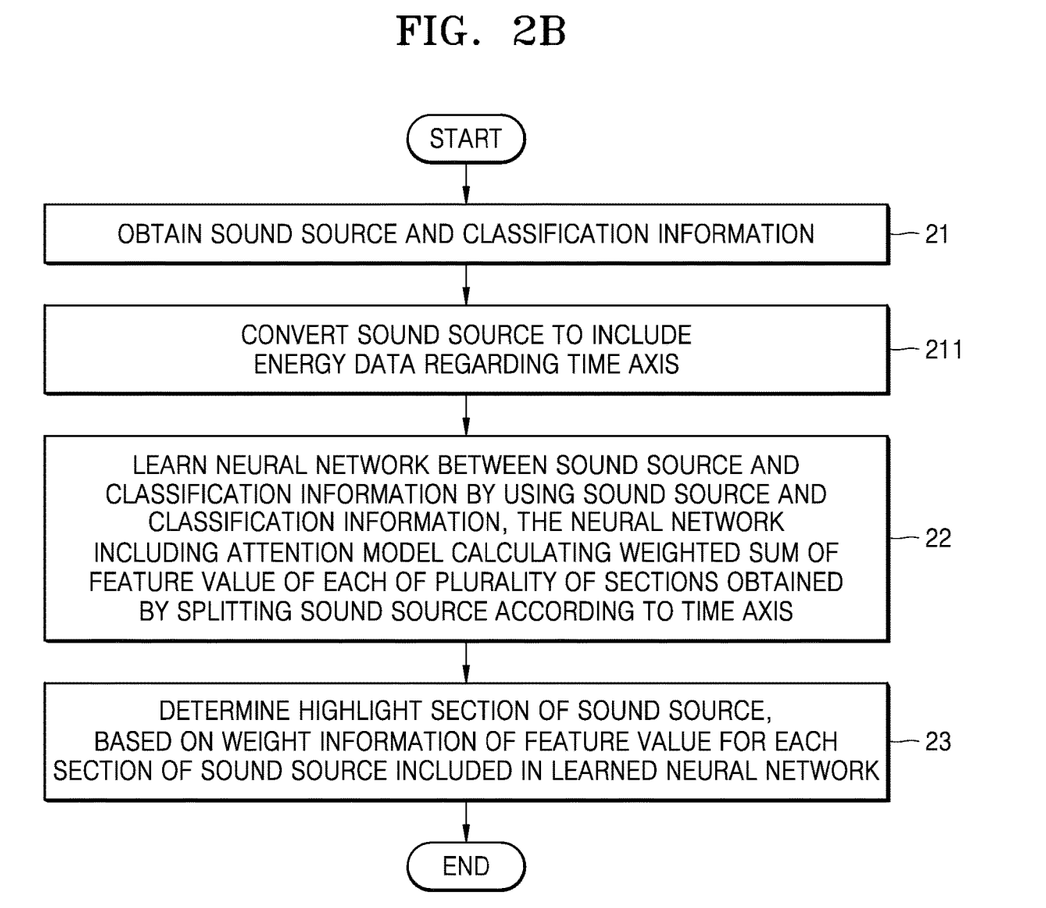

FIGS. 2A and 2B are flowcharts of methods of determining a highlight section of a sound source, according to embodiments of the present disclosure.

The flowcharts of FIGS. 2A and 2B include operations processed in time series by the processor 10 of FIG. 1. Thus, even if omitted below, details described above with reference to the components of FIG. 1 will be applied to the flowcharts of FIGS. 2A and 2B.

Referring to FIG. 2A, in operation 21, the sound source obtainer 11 of FIG. 1 obtains the sound source and the classification information.

In operation 22, the neural network processor unit 12 of FIG. 1 learns a neural network by using the sound source and the classification information obtained in operation 21. The neural network includes the attention model calculating the weighted sum of the feature value of each of the plurality of sections obtained by splitting the sound source according to the time axis. The neural network learned in operation 22 may be a model used to estimate the classification information from the sound source.

In operation 23, the highlight determiner 13 of FIG. 1 determines the highlight section of the sound source by referring to the weight for each section obtained from the neural network learned in operation 22.

Referring to FIG. 2B, the method of determining a highlight section of a sound source, according to an embodiment of the present disclosure, may further include operation 211 after operation 21.

Referring to FIG. 2B, in operation 211, the neural network processor unit 12 of FIG. 1 may convert the sound source data obtained in operation 21 to the sound source including the energy data for each frequency channel regarding the time axis.

In operation 22, the neural network processor unit 12 may learn the neural network including the attention model calculating the weighted sum of the feature value of each of the plurality of sections obtained by splitting the converted sound source according to the time axis, by using the sound source converted in operation 211.

Hereinafter, the components of FIG. 1 will be referred to while describing FIGS. 3 through 5.

Figure 3:
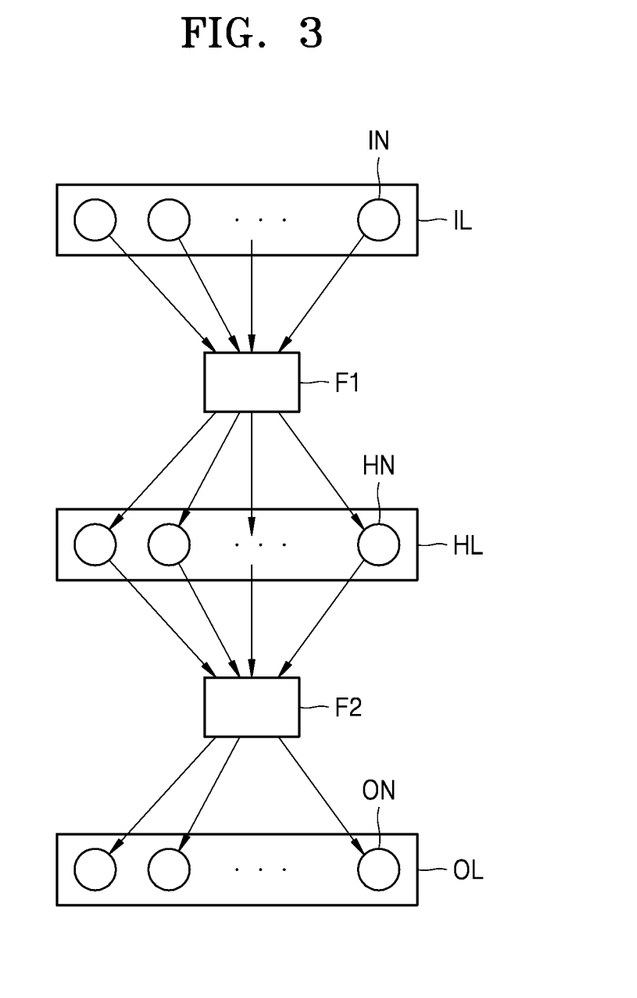
FIG. 3 is a flow diagram of an example of a neural network according to an embodiment of the present disclosure.

FIG. 3 is a flow diagram of an example of a neural network according to an embodiment of the present disclosure.

Referring to FIG. 3, the neural network according to an embodiment of the present disclosure includes an input layer IL including a plurality of input nodes IN, a hidden layer HL including a plurality of hidden nodes HN, and an output layer OL including a plurality of output nodes ON. The hidden layer HL may include fully connected one or more layers. When the hidden layer HL includes a plurality of layers, a function between the layers may be defined.

The neural network of FIG. 3 includes a first function F1 defining a relationship between the input layer IL and the hidden layer HL, and a second function F2 defining a relationship between the hidden layer HL and the output layer OL. The first function F1 and the second function F2 may be learned while the neural network is trained.

The neural network described in the present disclosure is an artificial neural network, and the artificial neural network is an algorithm that simulates a method by which the human brain recognizes a pattern. The artificial neural network may be trained based on labeled training data, according to an embodiment. According to an embodiment of the present disclosure, the training data may be the sound source data to which the classification information is labeled. The neural network processor unit 12 according to an embodiment of the present disclosure may learn the neural network by using a plurality of pieces of training data by repeating a process of adjusting a function such that an output value obtained by inputting the sound source data into the neural network model is approximate to the classification information labeled to the sound source data.

The artificial neural network includes a plurality of layer and each layer may include a plurality of nodes. Each node included in the neural network may be a vector. Each layer includes a plurality of nodes and an output of each layer is an input of a following layer. A function between layers may include a coefficient value between nodes included in the layers.

The function defines a connection relationship between the layers. In the example of FIG. 3, the first function F1 defines a connection relationship between the input layer IL and the hidden layer HL. For example, the first function F1 defines a connection relationship between the input node IN and the hidden node HL. A connection relationship between nodes may be expressed in a coefficient value between nodes.

According to an embodiment of the present disclosure, the neural network processor unit 12 may obtain the feature value for each section expressed in an N-dimensional vector by inputting the data for each section of the sound source into a CNN, and use the obtained feature value for each section as the input node IN.

The first function F1 shown in FIG. 3 may include the attention model outputting the weighted sum of the input node IN, and the attention model may include a coefficient connecting the input node IN and a weighted sum node. The weighted sum node may be one of the hidden nodes HN. A coefficient of each input node IN may be a weight of each input node IN.

The neural network processor unit 12 according to an embodiment of the present disclosure may train the neural network such that a result approximate to first classification information is output when a first sound source is input, by using the first sound source and the first classification information obtained by the sound source obtainer 11, and obtain, from the trained neural network, a coefficient between the input node IN corresponding to each section of the first sound source and the weighted sum node as a weight value of each section.

In the example of FIG. 3, there are a plurality of nodes in each layer, but an embodiment is not limited thereto. For example, the output layer OL may include one output node ON and the output node ON may indicate one piece of classification information. The output node ON may be expressed in an M-dimensional vector including a probability value corresponding to each item of the classification information, and at this time, M may correspond to the number of items of the classification information. According to an embodiment of the present disclosure, by setting a plurality of the output nodes ON, a highlight extracting method considering a plurality of pieces of classification information may be provided. For example, the output node ON may include a node indicating genre information and a node indicating mood information, and each node may be expressed in a vector of the same or different dimensions.

Figure 4:
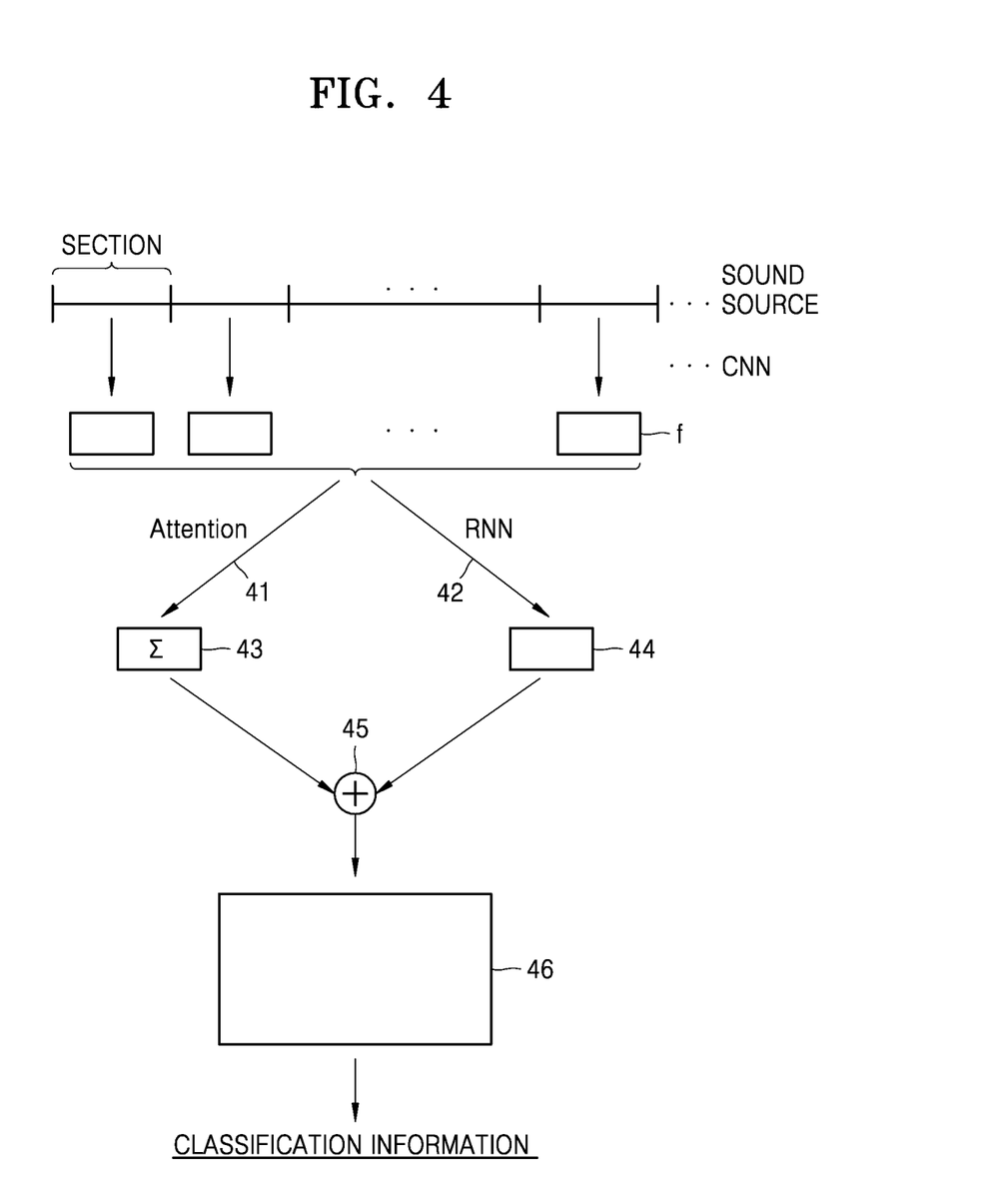
FIG. 4 illustrates a neural network according to an embodiment of the present disclosure from another perspective.

FIG. 4 illustrates a neural network according to an embodiment of the present disclosure from another perspective.

Referring FIG. 4, neural network processor unit 12 according to an embodiment of the present disclosure splits the sound source into the plurality of sections. For example, the neural network processor unit 12 splits the sound source into the plurality of sections having a pre-set time length. the neural network processor unit 12 may extract a feature value f for each section by applying a CNN to data for each section.

The neural network processor unit 12 may obtain a weighted sum 43 by applying an attention model 41 to the feature value f for each section, and include a feature value 44 for the entire sound source by applying an RRN 42 with respect to a sequence of the feature value f for each section. In FIG. 4, the neural network processor unit 12 applies the RRN 42 to obtain the feature value 44, but it is not necessary to use the RRN 42. For example, another algorithm for obtaining the feature value 44 regarding the entire sound source to which the feature value f for each section is applicable may be used according to a performance design of a neural network. For example, the feature value 44 may be obtained by adjusting a vector dimension after connecting all sequences of the feature value f of each section.

The neural network processor unit 12 according to an embodiment of the present disclosure may obtain an integrated feature value 45 by merging the weighted sum 43 and the feature value 44. For example, the neural network processor unit 12 may obtain the similarity between the weighted sum 43 and the feature value 44 as the integrated feature value 45, and use the integrated feature value 45 as an input of a final function 46. The final function 46 may include one or more matrixes that fully connect the integrated feature value 45 and the classification information that is a node of an output layer.

The neural network processor unit 12 may estimate the classification information regarding the sound source, based on a node value of the output layer output through the final function 46.

According to an embodiment, when the sound source input to the neural network includes the labeled classification information, the neural network processor unit 12 may train the neural network by updating functions included in the neural network such that the classification information estimated from the node value of the output layer output from the final function 46 of FIG. 4 approximates the classification information labeled to the sound source. Alternatively, the neural network processor unit 12 may output the classification information, obtain the weight information regarding each section by obtaining only a coefficient used by the attention model 41 while outputting the classification information, and then end the process without training the neural network.

As another example, when the sound source input to the neural network does not include the labeled classification information, the neural network processor unit 12 may estimate the classification information of the sound source based on the node value of the output layer output from the final function 46 of FIG. 4. In other words, the neural network stored in the memory 20 according to an embodiment of the present disclosure may be used to estimate the classification information from the sound source. The neural network according to an embodiment of the present disclosure may estimate the classification information in consideration of a weight for each section of the sound source. Accordingly, because it is possible to focus on the important section to estimate the classification information, a classification information estimation performance may be improved.

Figure 5:
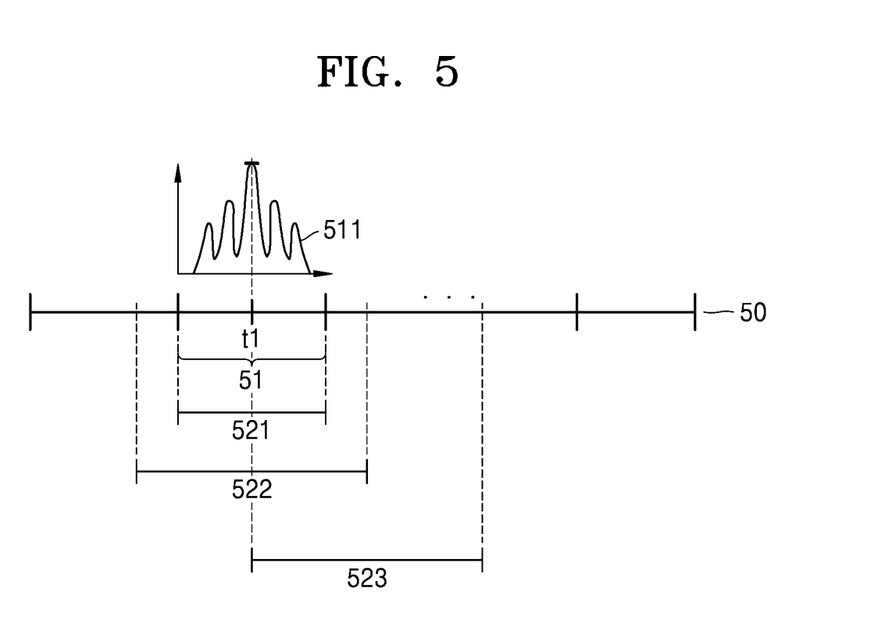
FIG. 5 is a diagram for describing a method of extracting a highlight section, according to an embodiment of the present disclosure.

FIG. 5 is a diagram for describing a method of extracting a highlight section, according to an embodiment of the present disclosure.

Referring to FIG. 5, a sound source 50 converted to include energy data regarding time and frequency axes is illustrated. A horizontal direction of the sound source 50 of FIG. 5 corresponds to the time axis and the sound source 50 may include energy data for each frequency channel regarding each time value. For example, an example of energy data 511 for each frequency channel regarding a first time point t1 is illustrated. A horizontal axis of the energy data 511 corresponds to a frequency channel.

The highlight determiner 13 according to an embodiment may determine an important section 51 in consideration of a weight for each section obtained by the neural network processor unit 12. Alternatively, the highlight determiner 13 may determine the important section 51 in consideration of a sum of energy data for each section and a weight for each section obtained by the neural network processor unit 12.

The highlight determiner 13 may select the first time point t1 having the highest energy data within a range set based on the important section 51 or the highest momentum of energy data regarding time, and determine a highlight section in consideration of the first time point t1. The momentum may be a primary or secondary derivative of the energy data.

For example, the highlight determiner 13 may determine the important section 51 including the first time point t1 as a highlight section 521. As another example, the highlight determiner 13 may determine a highlight section 522 having a pre-set length based on the first time point t1. As another example, the highlight determiner 13 may determine a highlight section 523 having a pre-set length with the first time point t1 as a start point.

The method for determining highlight section of sound source according to an embodiment of the present disclosure shown in FIG. 3 may be written as a program executable on a computer, and may be implemented on a digital computer operating the program by using a computer-readable recording medium. The medium may be an apparatus storing a computer executable program. In addition, the medium may be a variety of recording devices or storage devices in which a single or several pieces of hardware are combined, and is not limited to a medium directly connected to any computer system but may be distributed on a network. Examples of the medium include magnetic media such as hard disks, floppy disks and magnetic tape, optical recording media such as CD-ROMs and DVDs, magneto-optical media such as floptical disks, and ROM, RAM, flash memory, and the like which are configured to store program instructions. In addition, other examples of the medium may include a recording medium or a storage medium managed by an application store that distributes an application, a website that supplies or distributes various types of software, a server, or the like.

Hereinafter, the preferred embodiments for the present disclosure have been mainly described. Although the present disclosure has been described with reference to the embodiments illustrated in the drawings, the embodiments are merely examples, and one of ordinary skill in the art to which the present disclosure pertains may understand that the present disclosure may be modified without departing from the essential characteristics of the present disclosure and that other equivalent embodiments are possible. Therefore, the disclosed embodiments should be considered in descriptive sense only and not for purposes of limitation. The scope of the present disclosure is shown in the claims rather than the foregoing description, and all differences within the scope will be construed as being included in the present disclosure.

The invention claimed is:

1. A method of determining a highlight section of a sound source, the method comprising:
obtaining, by a processor, a sound source and classification information of the sound source, wherein the classification information is in a form of a vector indicating a probability of corresponding to each classification;
learning, by the processor, a neural network by using the sound source and the classification information, the neural network comprising an input layer including a node corresponding to a feature value of each of a plurality of sections obtained by splitting the sound source into said plurality of sections according to a time axis, an output layer including a node corresponding to the classification information, a hidden layer defined between the input layer and the output layer, a first function between the input layer and the hidden layer, and a second function between the hidden layer and the output layer, wherein the first function comprises an attention model for calculating a weighted sum of the feature value of each section; and
determining, by the processor, the highlight section of the sound source, based on weight information of a feature value node of each section included in the first function, wherein the weight information of the feature value node of each section indicates a degree of contribution of each section to an estimation of the classification information of the sound source.

2. The method of claim 1, wherein the hidden layer comprises a node corresponding to an integrated feature value of the sound source obtained from the feature value of each section, according to the first function.

3. The method of claim 1, wherein the first function further comprises a 1-1st function calculating a similarity of an output value of the attention model and an output value of a recurrent neural network (RRN) model, wherein the hidden layer comprises a node of the similarity.

4. The method of claim 1, further comprising, after the obtaining of the sound source and the classification information,
converting the sound source comprising sound data regarding the time axis to include energy data regarding the time axis,
wherein the plurality of sections are obtained by splitting the converted sound source according to the time axis.

5. The method of claim 4, wherein the determining of the highlight section comprises determining the highlight section based on the weight information of the feature value node of each section and the energy data of each section.

6. The method of claim 1, wherein the determining of the highlight section comprises determining an important section based on the weight information of the feature value node of each section and determining the highlight section among a plurality of sections of the sound source by referring to energy data within a section of a pre-set range before and after the important section.

7. The method of claim 6, wherein the determining of the highlight section comprises determining the highlight section in response to a point of time when momentum of the energy data is greatest within the section of the pre-set range.

8. A non-transitory tangible computer readable recording medium storing a computer program for determining a highlight section of a sound source, the program when executed by a computer performing the method of claim 1.

9. An apparatus for determining a highlight section of a sound source, the apparatus comprising:
a processor configured to include a plurality of functional units for performing a plurality predetermined functions, the functional units including,
a sound source obtainer configured to obtain a sound source and classification information of the sound source, wherein the classification information is in a form of a vector indicating a probability of corresponding to each classification;

a neural network processor configured to learn a neural network by using the sound source and the classification information, the neural network comprising an input layer including a node corresponding to a feature value of each of a plurality of sections obtained by splitting the sound source into said plurality of sections according to a time axis, an output layer including a node corresponding to the classification information, a hidden layer defined between the input layer and the output layer, a first function between the input layer and the hidden layer, and a second function between the hidden layer and the output layer, wherein the first function comprises an attention model for calculating a weighted sum of the feature value of each section; and a highlight determiner configured to determine a highlight section of the sound source, based on weight information of a feature value node of each section included in the first function, wherein the weight information of the feature value node of each section indicates a degree of contribution of each section to an estimation of the classification information of the sound source.

10. The method of claim 1, wherein the classification information includes at least one of a genre, a mood, a preferred age group, a theme and an atmosphere of the sound source.

11. The apparatus of claim 9, wherein the classification information includes at least one of a genre, a mood, a preferred age group, a theme and an atmosphere of the sound source.

* * * * *